United States Patent

Yamaguchi

[11] Patent Number: 4,514,052
[45] Date of Patent: Apr. 30, 1985

[54] HIGH SPEED OBJECTIVE LENS SYSTEM WITH AN ASPHERIC SURFACE

[75] Inventor: Tamikazu Yamaguchi, Sakai, Japan
[73] Assignee: Minolta Camera Kabushiki Kaisha, Osaka, Japan
[21] Appl. No.: 446,653
[22] Filed: Dec. 3, 1982
[30] Foreign Application Priority Data
Dec. 7, 1981 [JP] Japan ................. 56-197239
[51] Int. Cl.³ ................................. G02B 9/60
[52] U.S. Cl. ..................... 350/466; 350/432
[58] Field of Search ................. 350/432, 466
[56] References Cited
U.S. PATENT DOCUMENTS
3,459,468 8/1969 Marx et al. ................. 350/176
FOREIGN PATENT DOCUMENTS
47-19386 6/1972 Japan.
56-75613 6/1981 Japan.

*Primary Examiner*—John K. Corbin
*Assistant Examiner*—Paul M. Dzierzynski
*Attorney, Agent, or Firm*—Jackson, Jones & Price

[57] ABSTRACT

A Gauss type objective lens system with a high speed of F1.2 for 35 mm SLR cameras is provided. The lens system consists of seven lenses, the object side surface of the second lens being aspheric, and fulfills the following conditions:

$$0.65 < Da/Db < 1.1$$

$$B < 0 \text{ and } C < 0$$

$$0.55f < R < f$$

wherein: Da represents the sum of axial distance from the object side surface of the second lens to the image side surface of the third lens; Db represents the sum of axial distance from the object side surface of the fourth lens to the image side surface of the fifth lens; B and C represent the aspheric surface coefficients of the fourth degree and of the sixth degree, respectively; f represents the focal length of the whole lens system; and R represents the paraxial radius of curvature of the object side surface of the second lens.

8 Claims, 21 Drawing Figures

Spherical Aberration
Sine Condition

Astigmatism

Distortion

Lateral Aberration

Lateral Aberration

Lateral Aberration

Spherical Aberration
Sine Condition

Astigmatism

Distortion

Lateral Aberration

Lateral Aberration

Lateral Aberration

Spherical Aberration
Sine Condition

Astigmatism

Distortion

Lateral Aberration

Lateral Aberration

Lateral Aberration

HIGH SPEED OBJECTIVE LENS SYSTEM WITH AN ASPHERIC SURFACE

BACKGROUND OF THE INVENTION

1. Field of the Invention

The present invention relates to an objective lens system with a high speed of about F1.2 and a field angle of about 46 degrees, and more particularly to such an objective lens system with an aspheric surface.

2. Description of the Prior Art

It is generally known in the prior art that a Gauss-type lens system with a high speed of about F1.2 and a sufficiently long back focal distance achieves such a desirable correction for field curvature that the resolution of the image is satisfactory throughout the entire area. In such a Gauss-type lens system, however, the spherical aberration is generally in an overcorrection condition to remarkably deteriorate the contrast of the image due to the greatly generated sagittal flare. The overcorrection of the spherical aberration is caused by the steep curvatures of the negative lens elements sandwiching the aperture stop, and is hardly corrected even by utilizing a glass material of a high refractive index in the case of such a high speed lens system.

In this field of art, it has been known to utilize an aspheric surface for aberration correction.

Examples of the prior art which discloses a Gauss-type objective lens system with an aspheric surface can be found in U.S. Pat. No. 3,459,468, Japanese Patent Publication No. 47-19386 and Japanese laid open Patent Application No. 56-75613.

The prior art is still seeking to provide a high speed Gauss-type objective lens system with an improved optical performance.

SUMMARY OF THE INVENTION

An object of the present invention is to provide a high speed objective lens system with an improved aberration correction.

Another object of the present invention is to provide a high speed objective lens system capable of forming an image with high contrast.

Still another object of the present invention is to provide a high speed objective lens system utilizing an aspheric surface in an improved manner.

The present invention provides a Gauss-type lens system of seven lenses with an aspheric surface provided at the object side of the second lens, which fulfills the following conditions:

$0.65 < Da/Db < 1.1$ $B < 0$ $C < 0$ $0.55f < R < f$ wherein: Da represents the sum of the axial distance from the object side surface of the second lens to the image side surface of the third lens; Db represents the sum of the axial distance from the object side surface of the fourth lens to the image side surface of the fifth lens; B and C represent the aspheric surface coefficients, respectively, in the following equation provided that X represents the distance, measured toward the image side along a direction parallel with the optical axis, from the center of the aspheric surface to a point on the aspheric surface at the height, Y from the optical axis, and $r_0$ represents the paraxial radius of curvature of the aspheric surface:

$$X = \frac{Y^2}{r_0 + r_0\sqrt{1 - \left(\frac{Y}{r_0}\right)^2}} + AY^2 + BY^4 + CY^6 + DY^8 + \ldots;$$

f represents the focal length of the whole lens system; and R represents the paraxial radius of curvature of the object side surface of the second lens.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

DETAILED DESCRIPTION OF THE PREFERRED EMBODIMENTS

Figure 1:
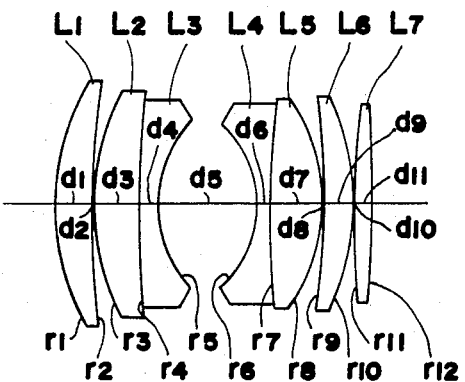
FIG. 1 represents a cross sectional view of the lens system according to a first embodiment of the present invention.

The following description is provided to enable any person skilled in the optical and camera field to make and use the invention and sets forth the best modes contemplated by the inventor for carrying out his invention. Various modifications, however, will remain readily apparent to those skilled in the art, since the generic principles of the present invention have been defined herein specifically to provide an improved high speed objective lens system. The derivation of the formulas and the relation of the powers set forth herein can be accomplished with the assistance of a computer. The present invention represents the parameters of a compromise balance of acceptable aberrations which can be relatively easily manufactured to provide a high speed objective lens system for utilization with a 35 mm SLR camera.

In the drawings, schematic cross sectional views disclose the position of the lens groups and lens elements, and follow the normal conventions of the object at the left-hand side of the drawing and the image plane at the right-hand side.

Figure 2:
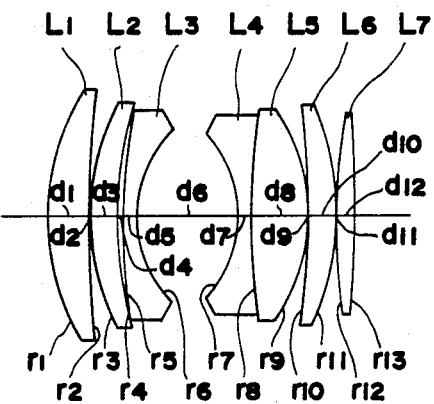
FIG. 2 represents a cross sectional view of the lens system according to a second embodiment of the present invention.
Figure 3:
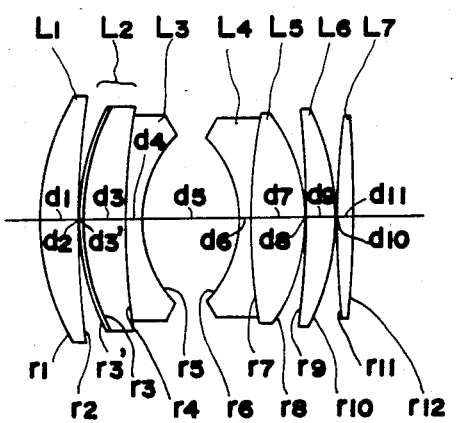
FIG. 3 represents a cross sectional view of the lens system according to a third embodiment of the present invention.
Figure 4A:
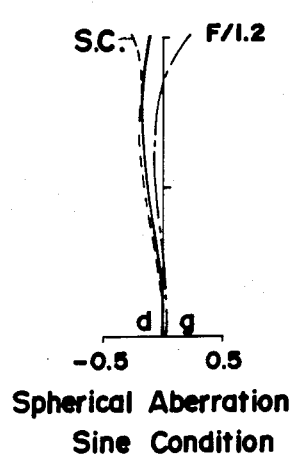
FIGS. 4a to 4f represent the aberration curves of the first embodiment.
Figure 4B:
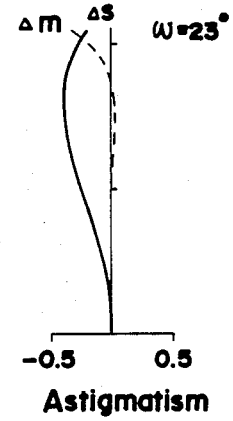
Figure 4C:
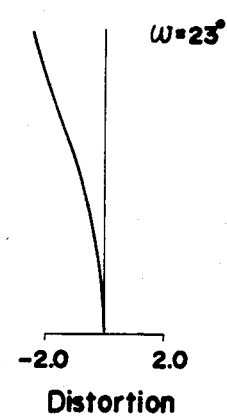
Figure 4D:
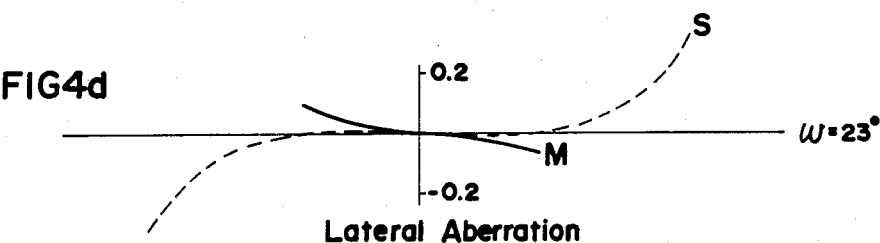
Figure 4E:
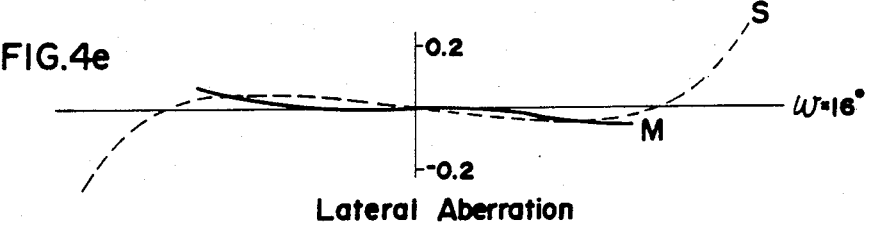
Figure 4F:
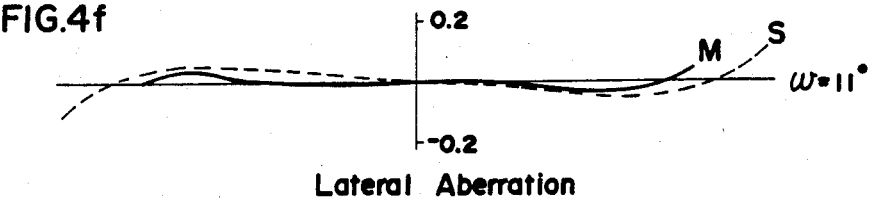
Figure 5A:
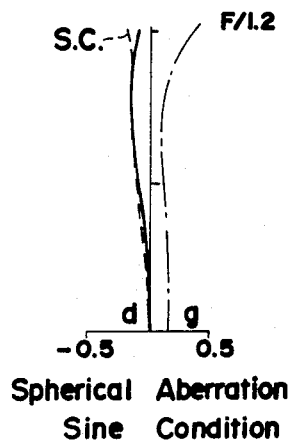
FIGS. 5a to 5f represent the aberration curves of the second embodiment.
Figure 5B:
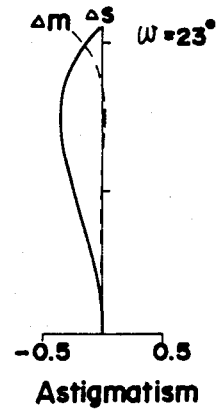
Figure 5C:
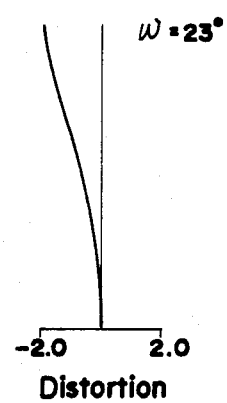
Figure 5D:
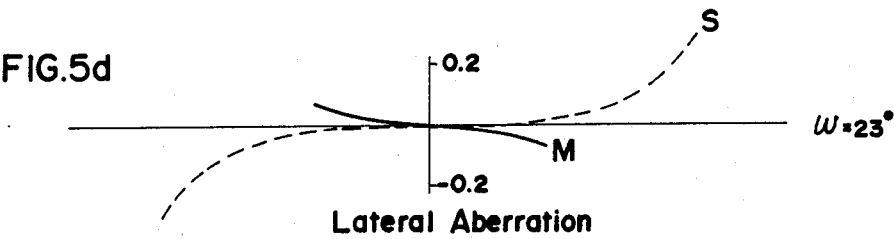
Figure 5E:
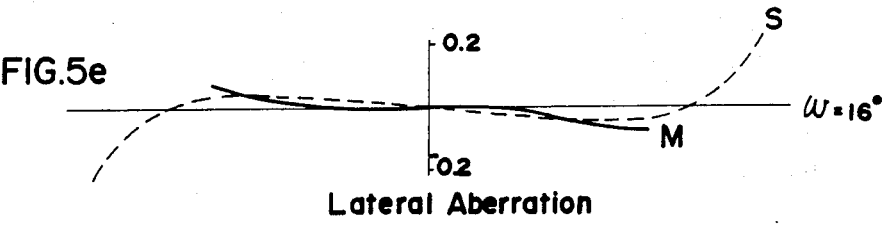
Figure 5F:
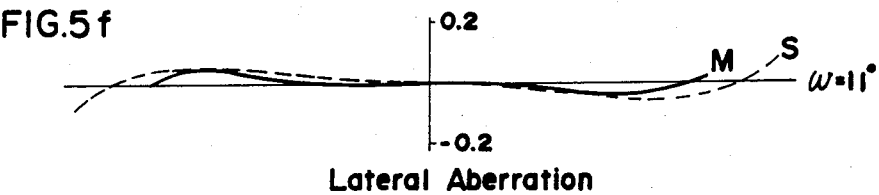
Figure 6A:
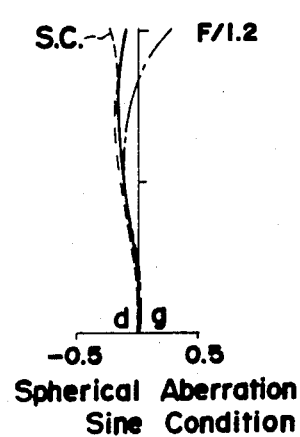
FIGS. 6a to 6f represent the aberration curves of the third embodiment.
Figure 6B:
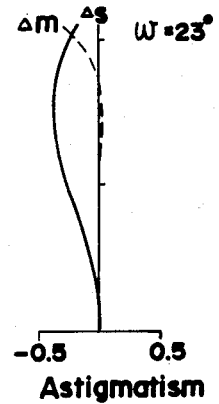
Figure 6C:
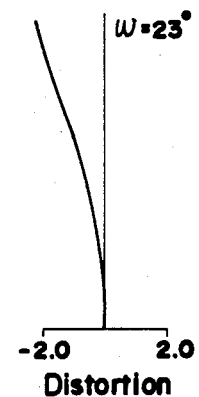
Figure 6D:
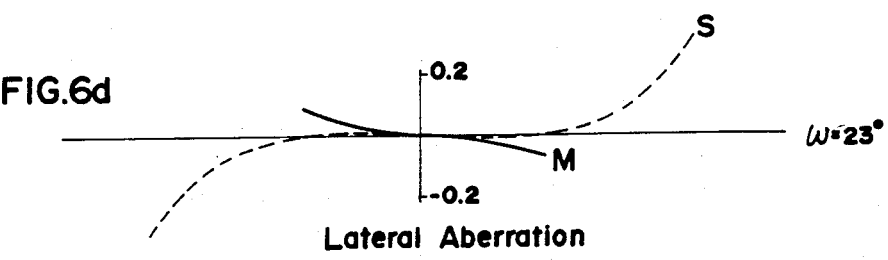
Figure 6E:
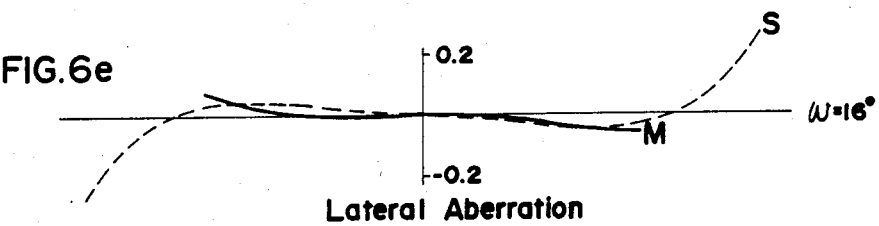
Figure 6F:
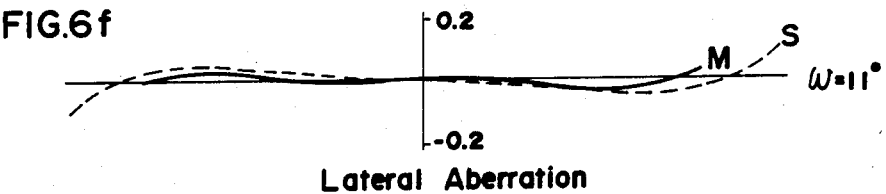

As disclosed in FIGS. 1 to 3, the present invention provides a high speed Gauss-type objective lens system with an aspheric surface comprising, from the object to image side: a front lens group consisting of a first positive lens($L_1$), a second positive lens($L_2$) and a third negative lens($L_3$); and a rear lens group consisting of a fourth negative lens($L_4$), a fifth positive lens($L_5$) cemented to the fourth negative lens, a sixth positive meniscus lens($L_6$) and a seventh biconvex lens($L_7$), wherein the second positive lens($L_2$) has an aspheric surface at its object side, the shape of the aspheric surface being designed so that the deviation of the aspheric surface from its paraxial radius to the object side is increased in accordance with the increase of the height from the optical axis. Further, the lens system according to the present invention fulfills the following conditions:

$$0.65 < Da/Db < 1.1 \qquad (1)$$

$$B < 0 \text{ and } C < 0 \qquad (2)$$

wherein: Da represents the sum of axial distance from the object side surface of the second positive lens($L_2$) to the image side surface of the third negative lens($L_3$); Db represents the sum of the axial distance from the object side surface of the fourth negative lens($L_4$) to the image side surface of the fifth positive lens($L_5$); B and C represent the aspheric surface coefficients, respectively, in the following equation provided that X represents the distance, measured toward the image side along a direction parallel with the optical axis, from the center of the aspheric surface to a point on the aspheric surface at the height, Y from the optical axis, and $r_0$ represents the paraxial radius of curvature of the aspheric surface:

$$X = \frac{Y^2}{r_0 + r_0\sqrt{1 - \left(\frac{Y}{r_0}\right)^2}} + AY^2 + BY^4 + CY^6 + DY^8 + \ldots$$

In utilizing an aspheric surface for a lens system, the location of the aspheric surface should be carefully selected in view of the effect on the aberration correction and the easiness in manufacturing the aspheric surface. As is already mentioned, the contrast of the image formed by the Gauss-type lens system of a high speed such as F1.2 is unsatisfactory due to the flare caused by the steep curvatures of the negative lenses sandwiching the aperture stop. To overcome this disadvantage, it is generally required to relatively moderate the curvature of the surfaces sandwiching the aperture stop for balancing the aberration correction. This requirement is, however, difficult to realize by a lens system consisting of spherical lens elements even if a high index glass is used. Therefore, an aspheric surface is needed at a surface having a positive refractive power so as to lessen the curvature of the surface in accordance with the increase of the height from the optical axis. The effect of the aspheric surface of such a shape, however, depends on the specific location thereof in the lens system. Especially, the location of such an aspheric surface suitable for the correction of both the spherical aberration and coma is limited. Further, the degree of possible deviation of the aspheric surface from its paraxial radius is restricted. With the above factors carefully taken into consideration, the present invention selects the third surface of the lens system numbered from the object side, i.e., the object side surface of the second positive lens($L_2$) as the most effective location of the aspheric surface in the case of and objective lens system with a high speed such as F1.2. If should be also noted that the paraxial radius of the aspheric surface is suitably designed.

The requirement in this type of lens system to secure a sufficiently long back focal distance also causes the undesirable steep curvatures of the pair of refractive surfaces sandwiching the aperture stop. To resolve this problem, the present invention provides the above mentioned condition(1), in which the relationship of the axial distance for the second and third lenses to that for the fourth and fifth lenses is defined for securing the sufficient back focal distance with the excessive curvatures of the pair of refractive surfaces sandwiching the aperture stop successfully avoided. If the upper limit of condition(1) is violated, the undesirable flare would increase, while the necessary marginal thickness of the second positive lens($L_2$) having the aspheric surface would be insufficient if the lower limit of condition(1) is violated.

In designing the lens system according to the present invention, it should be noted that the above efforts to reduce the sagittal flare contradicts the demand for decreasing the Petzval Sum to improve the field curvature. For the purpose of overcoming such a contradiction, it is recommended to use a high index glass as the lenses of positive refractive power. In view of the selection of glass in the Gauss-type lens system, it is also recommended to use a relatively low Abbe number glass as the positive lenses in the rear lens group for sufficiently correcting both the lateral and longitudinal chromatic aberrations.

Conditions(2) relates to the shape of the aspheric surface located on the object side of the second positive lens($L_2$). In utilizing the aspheric surface at the third surface of the high speed Gauss-type lens system for correcting spherical aberration, it is necessary to obtain, in addition to the reduced absolute value of spherical aberration at every ray height, a smooth shape of the spherical aberration curve by balancing between the spherical aberration of lower degree and that of higher degree. Conditions(2) which requires negative values for both the coefficients, B and C is necessary for this purpose. It is needless to say that the desired aspheric surface to correct the spherical aberration would be impossible if condition(2) is violated to result in $B > 0$ and $C > 0$. Further, if condition(2) is violated so that one of the coefficients, B and C is positive, the spherical aberration curve would show a shape of rough wave to deteriorate the Modulation Transfer Function(MTF) although the absolute value of spherical aberration may be within a limit at every ray height.

The MTF value for the d-line, w=0°, discloses a resolution of substantially 1.0 from 0 to 20 lines per millimeter. The MTF value is maintained substantially high through 50 lines per millimeter when condition (2) is maintained.

Further according to the present invention the following conditions are provided:

$$0.55f < R < f \qquad (3)$$

$$\frac{N_1 + N_5 + N_6}{3} > 1.75 \qquad (4)$$

$$\frac{\nu_5 + \nu_6}{2} > 40 \qquad (5)$$

wherein: f represents the focal length of the whole lens system; R represents the paraxial radius of curvature of the object side surface of the second positive lens($L_2$); $N_1$, $N_5$ and $N_6$ represent the refractive index with respect to d-line of the first positive lens($L_1$), the fifth positive lens($L_5$) and the sixth positive meniscus lens($L_6$), respectively; and $\nu_5$ and $\nu_6$ represent the Abbe number of the fifth positive lens($L_5$) and the sixth positive meniscus lens($L_6$).

Condition(3) defines the paraxial radius of curvature of the aspheric surface, which is located at the object side of the second positive lens($L_2$). If condition(2) is violated, the desirable aspheric surface for sufficiently correcting both the spherical aberration and coma cannot be effectively located at the object side of the second positive lens($L_2$).

Conditions(4) and (5) define the above mentioned requirements for the selection of glass in more detail. If condition(4) is violated, the correction of the field curvature would be difficult. On the other hand, the requirement of correcting both the lateral and longitudinal chromatic aberrations would not be attainable if condition(5) is violated.

The following Tables 1 to 3 disclose, respectively, the first through third embodiments of the present invention. In the Tables, f equals the focal length, r is the radius of curvature with respective sub numbers indicating the surfaces from the object to image side along the optical axis, d represents the axial distance and includes both the air spaces and the actual thickness of the lenses along the optical axis, N equals the refractive index and again, the sub numbers refer to the particular optical element from the object to image side, and finally, $\nu$ equals the Abbe number and the sub numbers refer to the specific lens elements from the object to image side. The asterisk(*) represents the aspheric surface, and its coefficients are shown at the bottom of the respective Tables.

TABLE 1

[Embodiment 1]

$f = 100.0 \; F_{No.} = 1.2$

| | Radius of Curvature | | Axial Distance | Refractive Index | | Abbe Number | |
|---|---|---|---|---|---|---|---|
| $L_1$ | $r_1$ | 83.157 | $d_1$ 11.982 | $N_1$ | 1.78850 | $\nu_1$ | 45.68 |
| | $r_2$ | 281.998 | $d_2$ 0.398 | | | | |
| $L_2$ | $r_3$* | 79.065 | $d_3$ 15.219 | $N_2$ | 1.74400 | $\nu_2$ | 44.93 |
| | $r_4$ | 336.229 | | | | | |
| $L_3$ | $r_5$ | 39.365 | $d_4$ 5.667 | $N_3$ | 1.63980 | $\nu_3$ | 34.55 |
| | | | $d_5$ 33.501 | | | | |
| $L_4$ | $r_6$ | −36.255 | $d_6$ 3.779 | $N_4$ | 1.73300 | $\nu_4$ | 28.24 |
| | $r_7$ | 258.131 | | | | | |
| $L_5$ | $r_8$ | −57.973 | $d_7$ 17.728 | $N_5$ | 1.77250 | $\nu_5$ | 49.77 |
| | | | $d_8$ 0.290 | | | | |
| $L_6$ | $r_9$ | −356.298 | $d_9$ 9.708 | $N_6$ | 1.77250 | $\nu_6$ | 49.77 |
| | $r_{10}$ | −84.313 | | | | | |
| | | | $d_{10}$ 0.290 | | | | |
| $L_7$ | $r_{11}$ | 240.134 | $d_{11}$ 6.213 | $N_7$ | 1.77250 | $\nu_7$ | 49.77 |
| | $r_{12}$ | −323.023 | | | | | |

*Aspheric Surface
$A = 0$
$B = -0.1129681 \times 10^{-6}$
$C = -0.1817826 \times 10^{-10}$
$D = 0.6096011 \times 10^{-14}$
$r_0 = r_3$

TABLE 2

[Embodiment 2]

$f = 100.0 \; F_{No.} = 1.2$

| | Radius of Curvature | | Axial Distance | Refractive Index | | Abbe Number | |
|---|---|---|---|---|---|---|---|
| $L_1$ | $r_1$ | 73.807 | $d_1$ 13.595 | $N_1$ | 1.78850 | $\nu_1$ | 45.68 |
| | $r_2$ | 389.519 | $d_2$ 0.310 | | | | |
| $L_2$ | $r_3$* | 73.784 | $d_3$ 8.915 | $N_2$ | 1.77250 | $\nu_2$ | 49.77 |
| | $r_4$ | 132.936 | $d_4$ 2.371 | | | | |
| $L_3$ | $r_5$ | 218.882 | $d_5$ 4.083 | $N_3$ | 1.65446 | $\nu_3$ | 33.86 |
| | $r_6$ | 39.249 | $d_6$ 34.487 | | | | |
| $L_4$ | $r_7$ | −37.953 | $d_7$ 3.389 | $N_4$ | 1.76182 | $\nu_4$ | 26.55 |
| | $r_8$ | 222.559 | | | | | |
| $L_5$ | | | $d_8$ 18.406 | $N_5$ | 1.77250 | $\nu_5$ | 49.77 |
| | $r_9$ | −62.659 | $d_9$ 0.288 | | | | |
| $L_6$ | $r_{10}$ | −346.275 | $d_{10}$ 9.391 | $N_6$ | 1.85000 | $\nu_6$ | 40.51 |
| | $r_{11}$ | −83.026 | $d_{11}$ 0.290 | | | | |
| $L_7$ | $r_{12}$ | 208.213 | $d_{12}$ 6.218 | $N_7$ | 1.77250 | $\nu_7$ | 49.77 |
| | $r_{13}$ | −424.675 | | | | | |

*Aspheric Surface
$A = 0$
$B = -0.1170173 \times 10^{-6}$
$C = -0.9056829 \times 10^{-11}$
$D = -0.4400188 \times 10^{-14}$
$r_0 = r_3$

TABLE 3

[Embodiment 3]

$f = 100.0 \; F_{No.} = 1.2$

| | Radius of Curvature | | Axial Distance | Refractive Index | | Abbe Number | |
|---|---|---|---|---|---|---|---|
| $L_1$ | $r_1$ | 81.901 | $d_1$ 12.574 | $N_1$ | 1.78850 | $\nu_1$ | 45.68 |
| | $r_2$ | 290.998 | $d_2$ 0.407 | | | | |
| $L_2$ | $r_3'$* | 79.247 | $d_3'$ 0.078 | $N_2'$ | 1.53300 | $\nu_2'$ | 34.30 |
| | $r_3$ | 79.247 | $d_3$ 14.926 | $N_2$ | 1.74400 | $\nu_2$ | 44.93 |
| $L_3$ | $r_4$ | 237.110 | $d_4$ 5.106 | $N_3$ | 1.63980 | $\nu_3$ | 34.55 |
| | $r_5$ | 39.574 | $d_5$ 33.428 | | | | |
| $L_4$ | $r_6$ | −36.796 | $d_6$ 3.624 | $N_4$ | 1.76182 | $\nu_4$ | 26.55 |
| | $r_7$ | 251.833 | | | | | |
| $L_5$ | $r_8$ | −59.513 | $d_7$ 17.587 | $N_5$ | 1.77250 | $\nu_5$ | 49.77 |
| | | | $d_8$ 0.291 | | | | |
| $L_6$ | $r_9$ | −378.311 | $d_9$ 9.708 | $N_6$ | 1.85000 | $\nu_6$ | 40.51 |
| | $r_{10}$ | −83.213 | $d_{10}$ 0.291 | | | | |
| $L_7$ | $r_{11}$ | 249.413 | $d_{11}$ 6.214 | $N_7$ | 1.77250 | $\nu_7$ | 49.77 |
| | $r_{12}$ | −356.655 | | | | | |

*Aspheric Surface
$A = 0$
$B = -0.1733578 \times 10^{-6}$
$C = -0.2088121 \times 10^{-10}$
$D = 0.5421115 \times 10^{-14}$
$r_0 = r_3'$ As in the above embodiments 1 and 3, the third negative lens($L_3$) may be cemented to the second positive lens($L_2$).

Further, as in embodiment 3, the second positive lens($L_2$) may consist of a spherical lens part($r_3$-$r_4$) and a thin layer part($r_3'$—$r_3$) coated on the spherical lens part at its object side($r_3$), the thin layer part($r_3'$—$r_3$) being made of a transparent refractive material such as UV-curable resins, the object side surface($r_3'$) of which is molded to serve as the aspheric surface of the second positive lens($L_2$). In such a construction of the second positive lens($L_2$), the cost of manufacturing the aspheric surface is expected to be lowered.

As can be readily appreciated, it is possible to deviate from the above embodiments of the present invention and, as will be readily understood by those skilled in the optical art, the invention is capable of many modifications and improvements within the scope and spirit thereof. Accordingly, it will be understood that the invention is not to be limited by these specific embodiments, but only by the scope and spirit of the appended claims.

What is claimed is:

1. A high speed objective lens system with an aspheric surface comprising, from the object to image side:
   a front lens group consisting of a first positive lens, a second positive lens and a third negative lens; and
   a rear lens group consisting of a fourth negative lens, a fifth positive lens cemented to the fourth negative lens, a sixth positive meniscus lens and a seventh biconvex lens, wherein the second positive lens has an aspheric surface at its object side, which increases the deviation from its paraxial radius to the object side in accordance with the increase of the height from the optical axis, the d-line modulation transfer function being substantially 1.0 for a resolution of 0 to 20 lines/millimeter when the lens system fulfills the following conditions:

$$0.65 < Da/db < 1.1$$

$$B < 0$$

$$C < 0$$

wherein:
Da represents the sum of axial distance from the object side surface of the second positive lens to the image side surface of the third negative lens;
Db represents the sum of axial distance from the object side surface of the fourth negative lens to the image side surface of the fifth positive lens;
B and C represent the aspheric surface coefficients, respectively, in the following equation provided that X represents the distance, measured toward the image side along the direction parallel with the optical axis, from the center of the aspheric surface to a point on the aspheric surface at the height, Y from the optical axis, and $r_0$ represents the paraxial radius of curvature of the aspheric surface:

$$X = \frac{Y^2}{r_0 + r_0 \sqrt{1 - \left(\frac{Y}{r_0}\right)^2}} + AY^2 + BY^4 + CY^6 + DY^8 + \ldots$$

2. The invention of claim 1, wherein the lens system further fulfills the following condition:

$$0.55f < R < f$$

wherein:
f represents the focal length of the whole lens system; and
R represents the paraxial radius of curvature of the object side surface of the second positive lens.

3. The invention of claim 1, wherein the second positive lens consists of a spherical lens part and a thin layer part coated on the spherical lens part at its object side, the thin layer part being made of a transparent refractive material, the object side surface of which serves as the aspheric surface of the second positive lens.

4. The invention of claim 1, wherein the third negative lens is cemented to the second positive lens.

5. The invention of claim 1, wherein the lens system further fulfills the following conditions:

$$\frac{N_1 + N_5 + N_6}{3} > 1.75$$

$$\frac{\nu_5 + \nu_6}{2} > 40$$

wherein:
$N_1$, $N_5$ and $N_6$ represent the refractive index with respect to d-line of the first positive lens, the fifth positive lens and the sixth positive meniscus lens, respectively; and
$\nu_5$ and $\nu_6$ represent the Abbe number of the fifth positive lens and the sixth positive meniscus lens.

6. The invention of claim 2, wherein the condition for R is as follows:

$$0.6f < R < f$$

7. The invention of claim 2, wherein the condition for R is as follows:

$$0.67f < R < f$$

8. A high speed objective lens system with an aspheric surface comprising the following design parameters:

| | Radius of Curvature | | Axial Distance | Refractive Index | | Abbe Number | |
|---|---|---|---|---|---|---|---|
| | | | $f = 100.0$ $F_{No.} = 1.2$ | | | | |
| $L_1$ | $r_1$ | 83.157 | $d_1$ 11.982 | $N_1$ | 1.78850 | $\nu_1$ | 45.68 |
| | $r_2$ | 281.998 | $d_2$ 0.398 | | | | |
| $L_2$ | $r_3$* | 79.065 | $d_3$ 15.219 | $N_2$ | 1.74400 | $\nu_2$ | 44.93 |
| | $r_4$ | 336.229 | | | | | |
| $L_3$ | $r_5$ | 39.365 | $d_4$ 5.667 | $N_3$ | 1.63980 | $\nu_3$ | 34.55 |
| | | | $d_5$ 33.501 | | | | |
| $L_4$ | $r_6$ | −36.255 | $d_6$ 3.779 | $N_4$ | 1.73300 | $\nu_4$ | 28.24 |
| $L_5$ | $r_7$ | 258.131 | $d_7$ 17.728 | $N_5$ | 1.77250 | $\nu_5$ | 49.77 |
| | $r_8$ | −57.973 | $d_8$ 0.290 | | | | |
| $L_6$ | $r_9$ | −356.298 | $d_9$ 9.708 | $N_6$ | 1.77250 | $\nu_6$ | 49.77 |
| | $r_{10}$ | −84.313 | $d_{10}$ 0.290 | | | | |
| $L_7$ | $r_{11}$ | 240.134 | $d_{11}$ 6.213 | $N_7$ | 1.77250 | $\nu_7$ | 49.77 |
| | $r_{12}$ | −323.023 | | | | | |

*Aspheric Surface
A = 0
B = −0.1129681 × $10^{-6}$
C = −0.1817826 × $10^{-10}$
D = 0.6096011 × $10^{-14}$
$r_0 = r_3$.

* * * * *